(12) United States Patent
Burg et al.

(10) Patent No.: US 7,135,977 B2
(45) Date of Patent: Nov. 14, 2006

(54) METHOD AND SYSTEM FOR TRACKING IDENTIFICATION DEVICES

(75) Inventors: Bernard Burg, Menlo Park, CA (US); Craig P. Sayers, Menlo Park, CA (US); William K. Wilkinson, Sunnyvale, CA (US); Harumi Anne Kuno, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 11/029,846

(22) Filed: Jan. 4, 2005

(65) Prior Publication Data

US 2006/0148443 A1 Jul. 6, 2006

(51) Int. Cl.
G08B 13/14 (2006.01)
(52) U.S. Cl. .................. 340/572.1; 455/456.1
(58) Field of Classification Search ............ 340/572.1, 340/539.13; 455/456.1; 707/3, 10
See application file for complete search history.

(56) References Cited

U.S. PATENT DOCUMENTS

| 6,246,882 | B1 | 6/2001 | Lachance |
| 6,509,828 | B1 * | 1/2003 | Bolavage et al. .......... 340/10.1 |
| 6,873,258 | B1 * | 3/2005 | Marples et al. .......... 340/572.1 |
| 6,975,941 | B1 * | 12/2005 | Lau et al. .................. 701/213 |
| 2003/0141985 | A1 | 7/2003 | Haller et al. |

* cited by examiner

Primary Examiner—John Tweel, Jr.

(57) ABSTRACT

A method of tracking an identification device includes storing data about the identification device in a register, the data to be stored including data relating to a forwarding location to which requests for information about the identification device should be forwarded. The identification device is attached to an item to be monitored. The method includes accessing the register when the identification device has been read and a request for information has been received. Details of the forwarding location are obtained from the register. The request is forwarded to the forwarding location and the requested information about the identification device is sent from the forwarding location to a requester of the information.

27 Claims, 3 Drawing Sheets

METHOD AND SYSTEM FOR TRACKING IDENTIFICATION DEVICES

FIELD

This invention relates to the tracking of identification devices and, more particularly, to a method of, and a system for, tracking identification devices.

BACKGROUND

The use of identification devices, such as radio frequency identification (RFID) tags, is becoming increasingly prevalent for monitoring the transportation and storage of goods and items. Some retailers are now beginning to insist on the use of such devices for monitoring the movement of goods including perishable goods.

With present systems, in order to obtain information about an RFID tag that has been read, it is necessary to access an electronic product code (EPC) Information Service. Assuming the location of that Information Service is not known a priori then it is discovered by using an EPC Object Naming Service to gain the address of the Information Service. A problem with this approach is that if the Object Naming Service fails there is no way of obtaining the address of the Information Service. Also, someone has to pay the cost of maintaining the centralized Object Naming Service.

In order for the EPC Information Service to work efficiently, the result of the address lookup should be cached locally. However, a problem with such an arrangement is that it is only possible if the address of the Information Service is static and is consistent across a number of individual tags.

SUMMARY

A method of tracking an identification device includes storing data about the identification device in a register, the data to be stored including data relating to a forwarding location to which requests for information about the identification device should be forwarded. The identification device is attached to an item to be monitored. The method further includes accessing the register when the identification device has been read and a request for information has been received. Details of the forwarding location are obtained from the register. The request is then forwarded to the forwarding location and the requested information about the identification device is sent from the forwarding location to a requester of the information.

DETAILED DESCRIPTION OF EXEMPLARY EMBODIMENT

Figure 1:
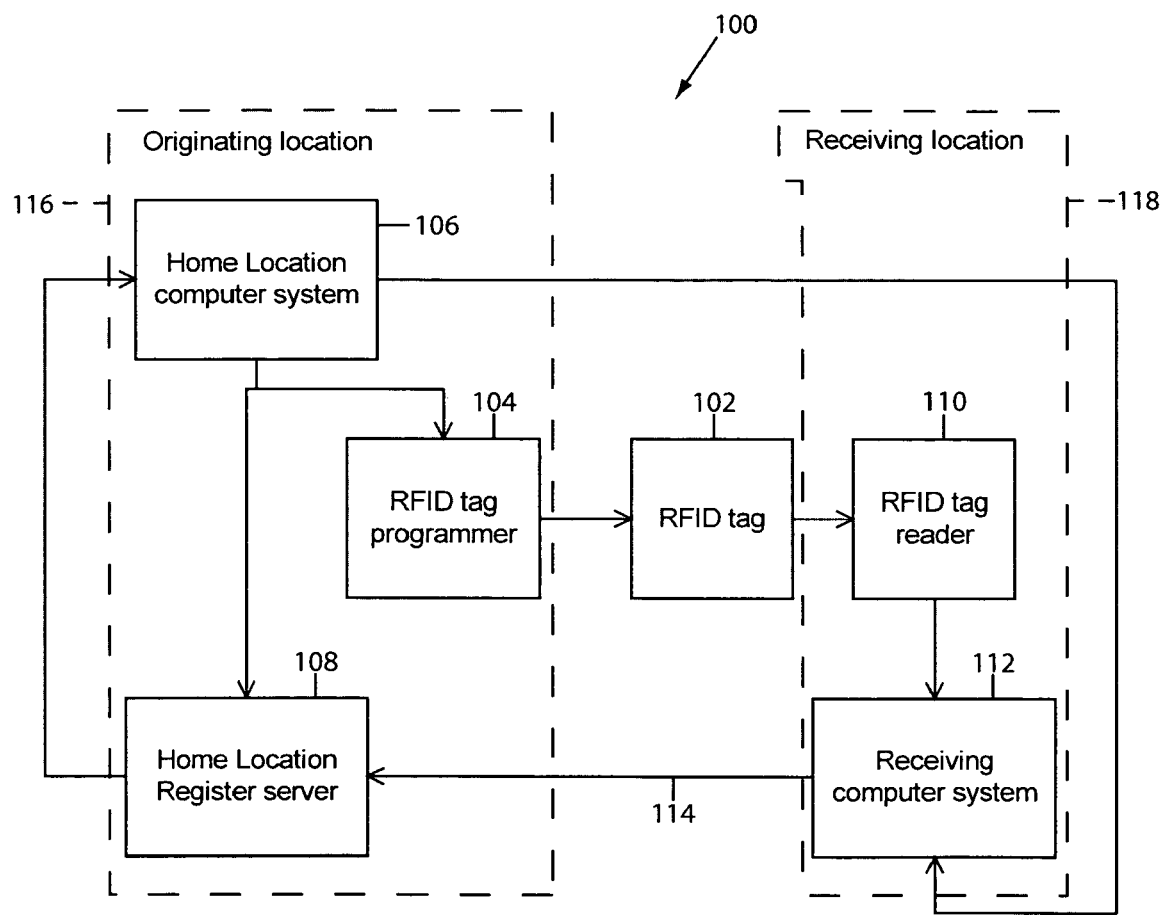
FIG. 1 shows a system, in accordance with an embodiment of the invention, for tracking an identification device.

In FIG. 1, reference numeral 100 generally designates a system, in accordance with an embodiment, for tracking an identification device. The system 100 includes a plurality of identification devices in the form of RFID tags, one of which is shown at 102 in FIG. 1.

Each tag 102 is created by a tag programmer 104. A computer, more particularly, a home computer system, 106 controls operation of the tag programmer 104 to produce the tags 102. In some cases, the tag 102 may have information hard-wired into it at the time it is manufactured. In that case, the tag programmer 104 need merely read the information contained in the tag 102. The information contained in the tag 102 includes an identification code of the tag 102 as well as the address of a register, or home register, 108.

The system 100 further includes a plurality of RFID tag readers 110 at various locations in a supply chain, the locations being remote from the home computer 106. This applies when the system 100 is to be used over a distributed area. It will be appreciated that a similar system could be used within a predetermined location, for example, a warehouse.

The tag readers 110 each communicate with a receiving computer 112. The receiving computer 112 and the home register 108 communicate with each other via a network generally indicated at 114. The network 114 is an existing communications network such as a TCP/IP network, i.e. the Internet. Other networks could also be used such as a telecommunications network, a satellite network, or the like. An advantage of the system 100 is that it does not require control of the network and also provides security for applications, even in un-trusted environments.

The home computer 106 and home register 108 are located in this embodiment at an originating location 116. The RFID tag reader 110 and receiving computer 112 are located at a receiving location 118. In use, the home computer 106 is used to create the RFID tag 102 via the RFID tag programmer 104. At the time the tag 102 is created, the address of the home register 108 of that tag 102 is encoded in the tag 102 together with the identification code of the tag 102. If desired, optional payload information is also stored on the tag 102.

At the same time that the tag 102 is created, the home computer 106 also stores tag information in the home register 108. The tag information stored in the home register 108 includes the tag identification code and the forwarding location to which requests for information about the particular tag 102 should be forwarded. In the embodiment shown in FIG. 1 of the drawings, the forwarding location to which requests for information about the tag 102 should be forwarded is the home computer 106.

Figure 2:
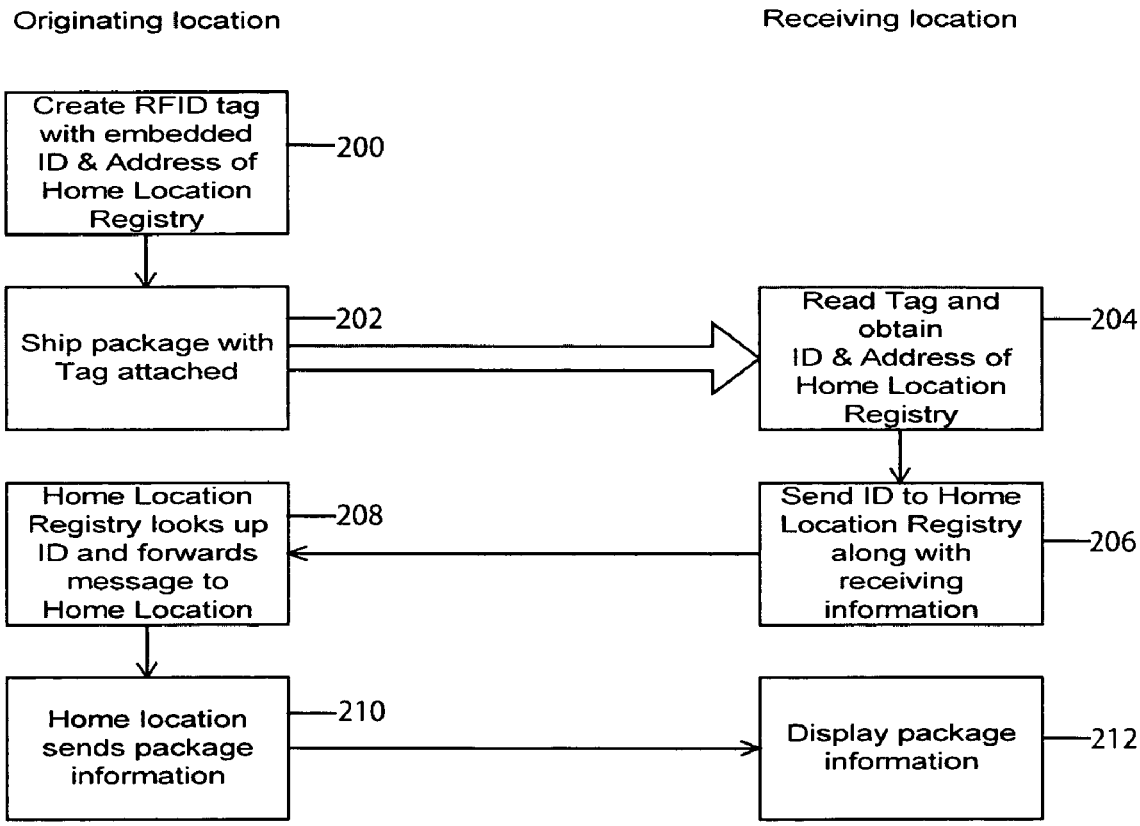
FIG. 2 shows a flow chart of the tracking of the identification device in accordance with an embodiment of the invention.

Referring to FIG. 2 of the drawings, a flow chart of the use of the system 100 is described in greater detail. At step 200, the tag 102 is created with its identification code and the address of the home register 108 stored on the tag 102. The tag 102 is attached to the item to be monitored, for example, a shipping pallet. The item is shipped at step 202.

At step 204, when the tag reader 110 at the receiving location 118 reads the tag, the tag reader 110 obtains the identification code of the tag 102 and the address of the home register 108 from the tag 102. The identification code and the address of the home register 108 are sent via the receiving computer 112 to the home register 108 as shown at step 206 over the network 114.

When the request for information is received by the home register 108, the home register 108 looks up the identification code 102 and the address of the forwarding location stored in the home register 108. The server 108 forwards the message to the forwarding location. In an embodiment, the forwarding location is the home computer 106 as shown at step 208.

At step 210, the home computer 106 sends the requested information to the receiving computer 112 over the network 114. The receiving computer 112, in turn, forwards the information to the tag reader 110 where the item information is displayed at step 212.

It is to be noted that the information sent by the receiving computer 112 to the home register 108 could, in addition to the tag identification code and the tag register address, also send optional payload information such as, for example, time, temperature, or the like.

When the home register 108 receives a request for information from the receiving computer 112, the home register 108 verifies the existence of the tag 102 in its registry and locates the forwarding location address. As described above, the home register 108 then forwards the incoming request to the forwarding location, in this case, the home computer 106. The forwarding location replies to the request from the receiving computer 112 providing information relating to the tag 102. For example, the forwarding location provides an inventory of items on a shipping pallet and an invoice number.

The receiving location 118 has an incentive to scan the tag 102 and request the information from the originating location 106 because that is the mechanism by which the receiving location 118 determines the required item information, for example, pallet contents and invoice number. It is also valuable to the originating location 116 to receive a request from the receiving location 118 because the originating location may, once it has received confirmation that a consignment has been received, bill for shipment of the consignment.

Figure 3:
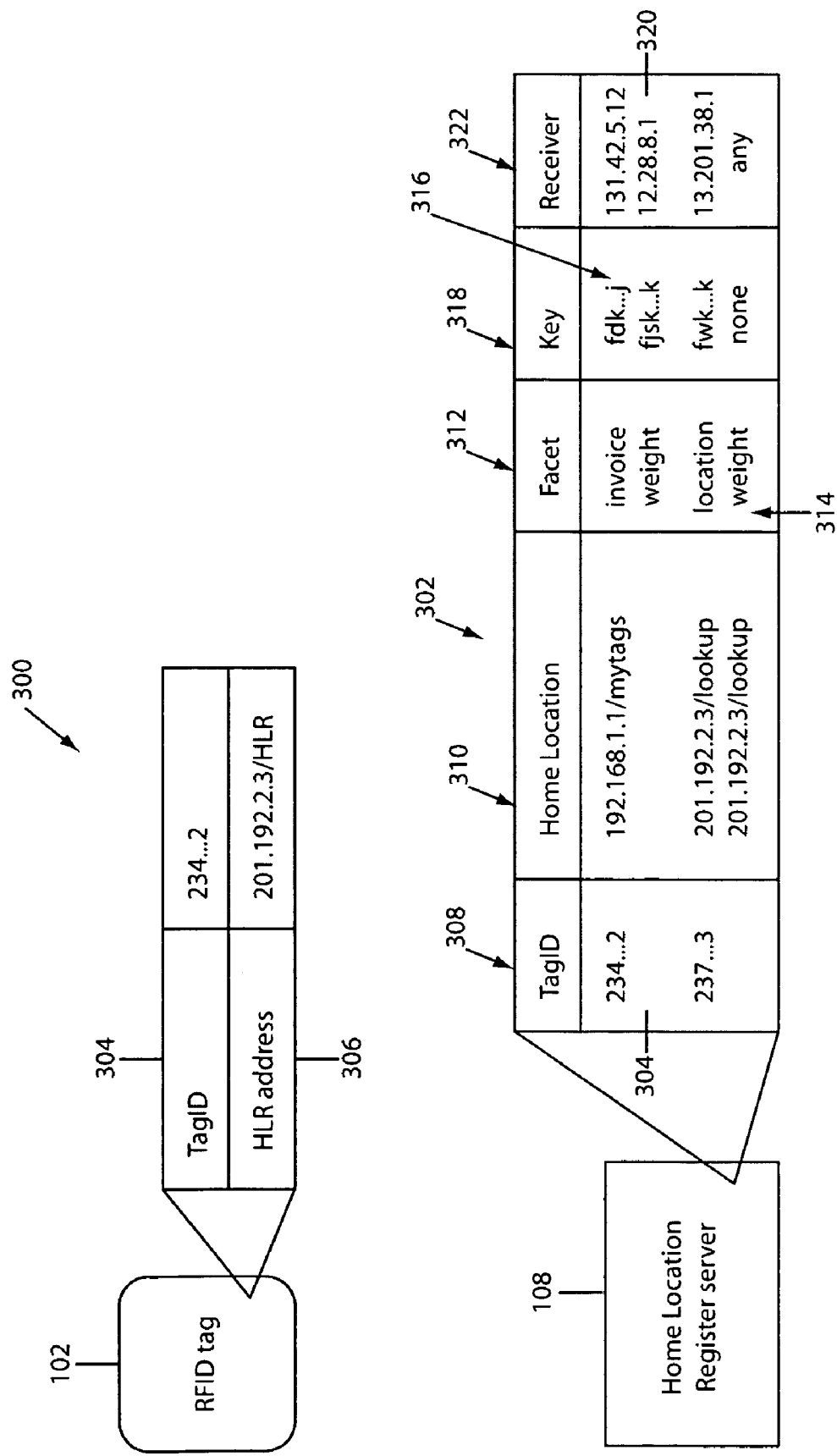
FIG. 3 shows a schematic example of data carried by an identification device and a register of the system of FIG. 1 in accordance with an embodiment of the invention.

In FIG. 3 of the drawings, reference numeral 300 generally designates stored information of a tag 102 and reference numeral 302 generally designates an address table of the home register 108. The information 300 stored on the tag 102 includes an identification code, or tag ID 304 and an address 306 of the home register 108 of the tag 102.

The table 302 of the home register 108 stores data on each of the tags 102 associated with that home register 108. Hence, a first column 308 contains the tag IDs 304 of the tags 102. A second column 310 contains the address of the forwarding location of each of the tags 102.

Facets of information 314 regarding each of the tags 102 are stored in a third column 312 of the table 302. To enable any facet of information 314 about a tag 102 to be accessed, each facet 314 may have a key 316 associated with it. These keys 316 are contained in a column 318 of the table 302. An authorization code 320 of the receiver is contained in a final column 322 of the table 302.

The use of the keys 316 provides a split-capability system and controls access to information carried by each tag 102. An out-of-band communication is used to provide each potential recipient with its key 316 to access those facets 308 to which the receiver 312 would be entitled. Thus, when the computer 106 at the originating location 116 creates the tag 102, it still records the identification codes 304 and address 306 on the tag 102.

However, when the data relating to that tag 102 are stored in the home register 108, the table 302 is created in the home register 106. Thus, the table 302 in the home register 108 includes the security facet, for example, the right to know the invoice number for a particular shipment, the secret key previously provided to the recipients and the address of the home computer for that particular facet of that particular tag 102.

With this system, when a recipient scans the tag 102 using the tag reader 110 and obtains the tag identification code 304 and the home register address 306, this information is sent to the home register 108 over the communications network 114. In addition, the desired facet 314 and the secret key 316 are also transmitted from the receiving computer 112 to the home register 108.

The home register 108 receives the message and verifies that the key 316 unlocks the requested facet 308. If there is a match, the home register 108 forwards the request to the home computer 106 registered for that facet 314. It will be noted in column 318 that certain facets 314 of certain tags 103 do not have a key associated with them. This means that access to such facets is unrestricted and all receivers have access to those facets 314. The system may be further secured by using an authentication phase to verify identity, for example, using secure socket connections and may further be secured by making the key dependent on the IP address of the sender.

Each originator of tags 102 has a home register 108. Each entity handling the item has a tag reader 110 so that, for example, readers 110 would be implemented in storehouses, trucks transporting the product, etc. Each time a new tag 102 is detected, the readers 110 send messages to the home register 108 via the network 114.

The system 100 can also be used in any other applications where items are marked with identification tags 102. For example, if an unknown object is found, its identification tag can be scanned and a message forwarded to the originating location 116. The reader 110 need not have knowledge of the originating location 116. The reader only needs to know to whom information is to be forwarded. For this, the reader only needs to know the address of the originating location.

In addition, the system 100 could be used for tracking luggage which has been marked with a tag 102. The home register 108 could be associated with an airline server at the airport where the luggage first passed through security. This would enable subsequent security checks to compare results with those when the luggage was first scanned. For example, x-ray images of the bag could be compared to verify that the bag has not been tampered with.

Optionally, the home register 108 could store a number of different forwarding locations and choose among the forwarding locations based on either changes at its location or information in the incoming message. Thus, for example, messages from shipping could go to one server, messages from warehouses to another server, messages from the finder of a lost object to yet another sever, etc.

Further, with the system 100, when an item with a tag 102 being tracked leaves the jurisdiction of the initial originating location, the home register 108 points towards a new home computer. In that case, subsequent treatment of the identification tag 102 is made at the new home location by the new home computer to which the data has been transmitted from the home register 108 at the originating location 116. This facilitates transmission in an automatic manner of data along with the tags 102 ensuring that the data associated with each tag 102 are always current at both the sender and the receiver side. The link to other downstream home locations also allows for filtering of data transmitted from one company to another and provides confidentiality of internal processes and internal matrices.

Once a home register has passed all data to another, the former home register can no longer access the contents of the message. This therefore provides a good mechanism for confidentiality in a chain of providers. It may be desirable that, once information on a tag 102 has been forwarded to a new home register, the former home register be uninvolved in operations between the new home register and the receiving computer 112. This is easily accomplished during the authentication phase described above with reference to FIG. 3. During this phase, the originating home location register 108 informs the receiving computer 112 of the new home register to enable direct communication between the new home register and the receiving computer 112. This enables secure, private communication between the new home register and the receiving computer 112 with the exception that the originating home register 108 is aware that the tag 102 has been seen by the tag reader 110.

In yet a further embodiment of the invention, it may be desirable that the home location of a tag 102 be known only to the originating home location 116 and the final destination 118. In other words, the address of the home location should be unknown to intermediate agents that may be involved in transportation of the item containing the tag from source to destination. For example, if a supplier ships a part to a customer, the supplier may not want the shipping company to know that the part came from that particular supplier. To enable this facility, the address 306 of the tag 102 may be encrypted and can only be decrypted at the final destination. The encryption/decryption keys could be exchanged between the originator and destination using out-of-band communications as described earlier. Instead, a public key encryption scheme could be used. For example, the originator could encrypt the address with the public key of the destination.

It is an advantage of the above-described embodiments that data linked to RFID tags always automatically follows the tags and is up-to-date. Since the address of the home location register is encoded directly within each tag there is no need for a centralized Object Naming Service and the infrastructure can be deployed over existing communications networks. Furthermore a different address can be programmed in any tag. The infrastructure is decentralized in that each of the companies deploying tags has control of its own data and gets an instantaneous update of information when the tags are detected by the readers. Further, the infrastructure preserves the security and the confidentiality of the information as messages flowing between trusted business partners can be or is decoded. In addition, the system can be used for sharing of dynamically updated data between disconnected networks.

Still further, entities using the system rely only on data collected using their own tags and can exercise fine-grained control over security and confidentially of the information. Yet a further advantage is that it is not necessary to pay third parties to store information about the tags.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of tracking an identification device, the method comprising storing data about the identification device in a register, the data to be stored including data relating to a forwarding location to which requests for information about the identification device should be forwarded;

storing an address of the register on the identification device so that the address can be obtained when the identification device is read;

attaching the identification device to an item to be monitored;

accessing the register when the identification device has been read and a request for information has been received;

obtaining details of the forwarding location from the register;

forwarding the request to the forwarding location; and sending the requested information about the identification device from the forwarding location to a requester of the information.

2. The method of claim 1 which includes associating the identification device with an originating location.

3. The method of claim 1 which includes associating the register containing data about the identification device with the originating location.

4. The method of claim 1 which includes, when the identification device has been read and the address of the register has been determined, sending the request for information to the register.

5. The method of claim 2 which includes, when the request has been received by the register, comparing data received about the identification device with data recorded in the register and updating the data about the identification device recorded at the originating location.

6. The method of claim 4 which includes, when the request for information has been received, checking the entitlement of the requester to receive the requested information.

7. The method of claim 6 which includes sending information about the identification device to the requester in accordance with the entitlement of the requester to receive the information.

8. The method of claim 6 which includes providing each potential requester with a key to obtain access to facets of information depending on the rights of the potential requester.

9. The method of claim 1 which includes adding content about the item to be monitored to the identification device.

10. The method of claim 1 which includes storing data relating to a plurality of forwarding locations and selecting one of the forwarding locations based on the information requested by the requester of the information.

11. The method of claim 1 which includes, once the information has been provided to the requester of the information enabling communication between the requester and the forwarding location without further recourse to the register.

12. The method of claim 1 which includes encoding data relating to the register to be decoded only by a party authorised to do so.

13. A system for tracking an identification device, the system comprising an identification device to be attached to an item, the identification device containing an identification code of the identification device;

a register that contains data about the identification device and a forwarding location, data regarding the register also being carried by the identification device;

a reader for reading the identification device; and a receiving computer for enabling the reader to access the register to obtain information about the identification device from the forwarding location.

14. The system of claim 13 which includes a computer in communication with the register for recording the identification code of the identification device in the register.

15. The system of claim 13 in which the receiving computer communicates with the register over a communications network.

16. The system of claim 13 which includes an access control arrangement stored in the register for controlling access to information about the identification device.

17. The system of claim 16 in which the access control arrangement is a split capabilities arrangement using keys to control access to facets of information about the identification device.

18. The system of claim 13 in which the identification device contains data about an item to which the identification device is to be attached.

19. A system for tracking an identification means, the system comprising
   an identification means for attachment to an item, the identification means containing an identification code of the identification means;
   a register means for storing data about the identification means and a forwarding location, data regarding the register means also being carried by the identification means;
   a reading means for reading the identification means; and
   a receiving computer means for enabling the reading means to access the register means to obtain information about the identification means from the forwarding location.

20. The system of claim 19 which includes a computer means for communicating with the register means to record the identification code of the identification means in the register means.

21. The system of claim 19 in which the receiving computer means communicates with the register means over a communications network.

22. The system of claim 19 which includes an access control means stored in the register means for controlling access to information about the identification means.

23. The system of claim 22 in which the access control means is a split capabilities arrangement using keys to control access to facets of information about the identification means.

24. The system of claim 19 in which the identification means contains data about an item to which the identification means is to be attached.

25. An identification device which comprises
   an identification code; and
   an address of a register in which the identification device is stored, the address of the register providing access to a forwarding location.

26. The identification device of claim 25 which is a passive unit able to be interrogated by a reader.

27. A home location for a system for tracking an identification device, the home location comprising
   a home computer for generating an identification device; and
   a home register in communication with the home computer for storing data relating to an identification device generated by the home computer, the home register containing data relating to a forwarding location having information about the identification device.

* * * * *